United States Patent
Guerrassi et al.

(10) Patent No.: US 8,820,150 B2
(45) Date of Patent: Sep. 2, 2014

(54) INJECTION CONTROL METHOD

(75) Inventors: Noureddine Guerrassi, Vinueil (FR); Pierre Allezy, Messancy (BE)

(73) Assignee: Delphi International Operations Luxembourg S.A.R.L., Luxembourg (LU)

( * ) Notice: Subject to any disclaimer, the term of this patent is extended or adjusted under 35 U.S.C. 154(b) by 0 days.

(21) Appl. No.: 13/639,203

(22) PCT Filed: Apr. 8, 2011

(86) PCT No.: PCT/EP2011/055503
§ 371 (c)(1),
(2), (4) Date: Oct. 4, 2012

(87) PCT Pub. No.: WO2011/124679
PCT Pub. Date: Oct. 13, 2011

(65) Prior Publication Data
US 2013/0019668 A1 Jan. 24, 2013

(30) Foreign Application Priority Data
Apr. 8, 2010 (EP) .................................... 10159319

(51) Int. Cl.
| | | |
|---|---|---|
| G01M 15/08 | (2006.01) | |
| F02D 35/02 | (2006.01) | |
| F02D 41/00 | (2006.01) | |
| F02D 41/06 | (2006.01) | |
| F02P 5/15 | (2006.01) | |
| F02P 5/153 | (2006.01) | |
| F02P 7/06 | (2006.01) | |

(52) U.S. Cl.
CPC ............ *F02D 35/023* (2013.01); *F02D 41/009* (2013.01); *F02D 41/062* (2013.01); *F02D 2200/0602* (2013.01); *F02P 5/1502* (2013.01); *F02P 5/1506* (2013.01); *F02P 5/153* (2013.01); *F02P 7/06* (2013.01); *Y02T 10/46* (2013.01); *F02D 2041/0092* (2013.01)
USPC ....................................................... 73/114.16

(58) Field of Classification Search
CPC ................ F02D 41/062; F02D 35/023; F02D 2200/0602; F02D 41/009; F02D 2041/0092; Y02T 10/46; F02P 5/1506; F02P 5/1502
USPC ......................................... 73/114.16, 114.27
See application file for complete search history.

(56) References Cited

U.S. PATENT DOCUMENTS

| | | | |
|---|---|---|---|
| 5,402,675 | A | 4/1995 | Entenamann et al. |
| 5,611,134 | A | 3/1997 | Dixon et al. |

(Continued)

FOREIGN PATENT DOCUMENTS

| | | |
|---|---|---|
| DE | 10113194 | 9/2002 |
| FR | 2676251 | 11/1992 |
| FR | 2886343 | 12/2006 |

OTHER PUBLICATIONS

International Search Report dated Feb. 8, 2011.

*Primary Examiner* — Freddie Kirkland, III
(74) *Attorney, Agent, or Firm* — Mark H. Svoboda

(57) ABSTRACT

A method of determining whether a cylinder in an engine system comprising a plurality of cylinders is ready for injection/ignition, the method comprising: monitoring the in-cylinder pressure of each of the plurality of cylinders within the engine system; determining a pressure related parameter for each cylinder within the engine system; wherein, in the event that the pressure related parameter in a given cylinder exceeds a first threshold, the method further comprises performing a diagnostic test in order to determine whether the given cylinder is ready for injection/ignition.

19 Claims, 6 Drawing Sheets

(56) References Cited

U.S. PATENT DOCUMENTS

| | | |
|---|---|---|
| 6,553,305 B2 * | 4/2003 | Dixon et al. .................. 701/102 |
| 6,595,043 B2 * | 7/2003 | Jaye ........................... 73/114.06 |
| 7,117,082 B2 * | 10/2006 | Kohira et al. ................. 701/114 |
| 7,255,090 B2 * | 8/2007 | Fader et al. ................... 123/435 |
| 7,422,000 B2 * | 9/2008 | Kesse et al. .................. 123/299 |
| 7,543,485 B2 * | 6/2009 | Chemello .................. 73/114.51 |
| 7,921,699 B2 * | 4/2011 | Hoshi et al. ............... 73/114.26 |
| 7,921,700 B2 * | 4/2011 | Raichle et al. ............. 73/114.27 |
| 8,370,050 B2 * | 2/2013 | Nishimura et al. ........... 701/111 |
| 8,459,234 B2 * | 6/2013 | Nakata et al. ................. 123/480 |
| 2002/0087256 A1 | 7/2002 | Dixon et al. |
| 2007/0006842 A1 * | 1/2007 | Kesse et al. .................... 123/299 |
| 2007/0137619 A1 * | 6/2007 | Fader et al. .................... 123/435 |
| 2008/0307870 A1 * | 12/2008 | Chemello .................. 73/114.51 |
| 2010/0312456 A1 * | 12/2010 | Nishimura et al. .......... 701/103 |
| 2012/0042853 A1 * | 2/2012 | Sakata .......................... 123/447 |

* cited by examiner

INJECTION CONTROL METHOD

CROSS REFERENCE TO RELATED APPLICATIONS

This application is a national stage application under 35 U.S.C. 371 of PCT Application No. PCT/EP2011/055503 having an international filing date of 8 Apr. 2011, which designated the United States, which PCT application claimed the benefit of European Patent Application No. 10159319.2 filed 8 Apr. 2010, the entire disclosure of each of which are hereby incorporated herein by reference.

FIELD OF THE INVENTION

The present invention relates to an injection control method. In particular, the present invention relates to a method of phasing the injection/ignition event and determining if a cylinder within an engine system is ready for ignition/injection.

BACKGROUND TO THE INVENTION

A representation of a typical engine system 10 is shown in FIG. 1 in which the engine system comprises four cylinders (1, 2, 3, 4) which are coupled to a crankshaft 11. The crankshaft carries a flywheel 12 which comprises a number of teeth 14 on its outer periphery. The teeth are equally spaced about the periphery of the flywheel apart from in one or more regions 16 where there is a gap in the teeth. In FIG. 1 only one region 16 is shown but it will be appreciated that there may be, for example, two gaps in the teeth.

A crank sensor 18, for example, a variable reluctance sensor or a Hall effect sensor (used for stop/start option), is shown in proximity to the flywheel 12. The sensor is used to detect motion of the crank teeth 14 and the decoded signal output from the sensor 18 is used to provide position information which is used for engine speed measurement and fuel pulse scheduling. It is noted that any suitable sensor may be used to measure crank tooth motion, e.g. an optical based sensor may be used. It is also noted that any suitable flywheel arrangement (i.e. number of teeth and configuration of teeth) may be used to provide crank angle positions.

Each cylinder is associated with an injector (20, 22, 24, 26), the injectors in turn being in fluid communication with a common rail (not shown in FIG. 1).

A cam arrangement (comprising a camshaft 28 and a plurality of cams 30) controls the opening and closing of the air inlet 32 and outlet valves 34. A cam sensor 36 is associated with the cam shaft 28.

The crank sensor 18 and cam sensor 36 output signals to an engine control unit 38.

It is noted that in current 4-stroke internal combustion engines the fuel injection or ignition timing are controlled using these two sensors (crank sensor and cam sensor). The crank sensor essentially counts the flywheel teeth (typically a total of 60 teeth with two teeth missing. It is noted that the flywheel has two missing teeth to allow measurement of absolute crank angle position and cylinder 1 top dead centre position) in order to return engine speed data and crankshaft position and the cam sensor is arranged to generate a signal every two engine revolutions to indicate that a given cylinder is in its compression stroke and therefore ready for ignition or injection.

It is noted that the crank sensor may also be used to calculate the instantaneous rotation speed for various engine control strategies like torque cylinder balancing and injector fuelling corrections.

It is also noted that in some recent systems, the cam sensor is configured to generate more than one signal per revolution to reduce dead synchronisation time (for example many recent cam arrangements generate three targets per camshaft revolution).

FIG. 2 shows an example of a known configuration used to determine a standard injection timing angle. It is noted that in FIG. 2 the cylinders fire in the following sequence during engine operation: cylinder 2; cylinder 1; cylinder 3; cylinder 4; cylinder 2 etc.

In known engine systems conventional phasing using the output of the cam sensor means that during engine start up the system is calibrated to make its first injection on the second cylinder in the engine (referred to as second top dead centre or second TDC) in order to avoid an incomplete ignition on the first cylinder due to low cylinder gas pressure and temperature. In FIG. 2 this means that the ECU does not inject initially into cylinder 2 (which appears first in the engine block) but "skips" to cylinder 1 which is next in the sequence. The order on engine start up is therefore: cylinder 1; cylinder 3; cylinder 4; cylinder 2. This cylinder skipping has the effect of delaying engine start up.

It is an object of the present invention to overcome or substantially mitigate problems with the prior art.

STATEMENTS OF INVENTION

According to a first aspect of the invention there is provided a method of determining whether a cylinder in an engine system comprising a plurality of cylinders is ready for injection/ignition, the method comprising: monitoring the in-cylinder pressure of each of the plurality of cylinders within the engine system; determining a pressure related parameter for each cylinder within the engine system wherein, in the event that the pressure related parameter in a given cylinder exceeds a first threshold, the method further comprises performing a diagnostic test in order to determine whether the given cylinder is ready for injection/ignition.

The present invention recognizes that the function of the cam sensor within an engine system to determine the phasing of ignition/injection can be replaced by the use of in-cylinder pressure signals. The method according to the first aspect of the present invention relates to monitoring all the cylinders within the engine system simultaneously until a pressure related parameter exceeds a threshold. Once one cylinder has been identified as exceeding the first threshold then one or more further processing steps ("performing a diagnostic test") may be performed with respect to that cylinder or the engine system to see if injection/ignition should be scheduled on that cylinder. It is noted that the present invention may reduce emissions relating from unburned fuel in the first injection on engine start up and may also allow for a cleaner stop-start strategy during urban driving use. Use of the present invention therefore allows the cam sensor to be removed from the engine system.

Conveniently, the pressure related parameter may be the rate of change of pressure within the cylinders with respect to time or crank angle.

If the engine system comprises a common rail for supplying fuel to a plurality of fuel injectors, then the diagnostic test may comprise a pressure related diagnostic test comprising monitoring the fuel pressure within the common rail and determining if the rail pressure exceeds a rail threshold value (a "common rail" check step). In other words, the method may comprise determining that the pressure related parameter exceeds the first threshold and then determining that the rail pressure exceeds a rail threshold value.

The method may also perform a thermodynamic check on the given cylinder by determining that the pressure within the given cylinder exceeds a second threshold value (in other words the diagnostic test may comprise a pressure related diagnostic test comprising determining whether the pressure within the given cylinder exceeds a second threshold value). If the pressure exceeds the second threshold then injection into or ignition within the given cylinder may take place.

Conveniently, the method may comprise sequentially determining if the first threshold value has been exceeded then determining if the rail threshold value has been exceeded and then determining if the second threshold value has been exceeded. It is noted that for non-common rail systems the method may sequentially determine if the first threshold value has been exceeded and then determining if the second threshold value has been exceeded.

In the event that the rail pressure does not exceed the rail threshold value then preferably the method returns to determining the next cylinder within which the pressure related parameter exceeds the first threshold. The method may then be repeated replacing the next cylinder for the first cylinder in the diagnostic tests.

In the event that the pressure within the first cylinder does not exceed the second threshold value then preferably the method returns to determining the next cylinder within which the pressure related parameter exceeds the first threshold. The method may then be repeated replacing the next cylinder for the first cylinder in the diagnostic tests.

Conveniently, in-cylinder pressure sensors may be used to output pressure signals to allow the monitoring of in-cylinder pressures.

The present invention may preferably be performed during engine start up.

The method may further comprise outputting a notification signal, for example to an engine control unit. The notification signal may comprise data to be used by an injection/ignition control unit to control the engine system.

According to a second aspect of the present invention, there is provided a control module arranged to determine whether a cylinder in an engine system comprising a plurality of cylinders is ready for injection/ignition, the module comprising: a monitoring module arranged to monitor the in-cylinder pressure of each of the plurality of cylinders within the engine system; a processor arranged to: determine a pressure related parameter for each cylinder within the engine system; wherein, in the event that the pressure related parameter in a given cylinder exceeds a first threshold, the module is arranged to perform a diagnostic test in order to determine whether the given cylinder is ready for injection/ignition The processor may conveniently be arranged to phase the injection or ignition event in dependence on whether the cylinder is ready for injection/ignition.

The invention extends to an engine control unit comprising a control module according to the second aspect of the present invention. The invention also extends to an engine control unit that is arranged to carry out the method of the first aspect of the invention.

According to a third aspect of the present invention, there is provided a method of phasing an injection or ignition event in an engine system comprising: determining whether a cylinder in an engine system is ready for injection/ignition according to the method of the first aspect of the present invention; phasing the injection or ignition event in dependence on whether the cylinder is ready for injection/ignition.

The method according to the third aspect of the invention may, for example, allow the injection/ignition phasing within a four stroke engine to be achieved without the use of a cam sensor by virtue of in-cylinder gas pressure sensor output.

The invention also extends to an engine control unit that is arranged to carry out the method of the third aspect of the invention.

The invention also extends to a computer readable medium comprising a computer program arranged to configure a computer or an electronic control unit to implement the method according to the first or third aspects of the present invention.

According to a fourth aspect the present invention provides a method of determining whether a cylinder in an engine system comprising a plurality of cylinders is ready for injection/ignition, the method comprising: monitoring the in-cylinder pressure of each of the plurality of cylinders within the engine system; determining a pressure related parameter for each cylinder within the engine system wherein the pressure related parameter is simultaneously monitored for all the cylinders within the engine system until the pressure related parameter within one of the plurality of cylinders is identified as exceeding a first threshold value, the method then comprising performing a diagnostic test with respect to the cylinder having a pressure related parameter that exceeds the first threshold value to determine if injection/ignition should be scheduled on that cylinder.

It is noted that preferred features of the first aspect of the present invention may also apply to the other aspects of the present invention.

BRIEF DESCRIPTION OF THE DRAWINGS

Embodiments of the present invention are described, by way of example only, with reference to the following figures, in which.

DETAILED DESCRIPTION OF THE INVENTION

It is noted that like numerals are used to denote like features throughout the Figures.

The Applicant has recently proposed a new engine control system and method (see European Patent Application: 08168714.7) which utilises in-cylinder pressure measurements to provide pressure readings which are subsequently used to control engine operation.

Figure 3:
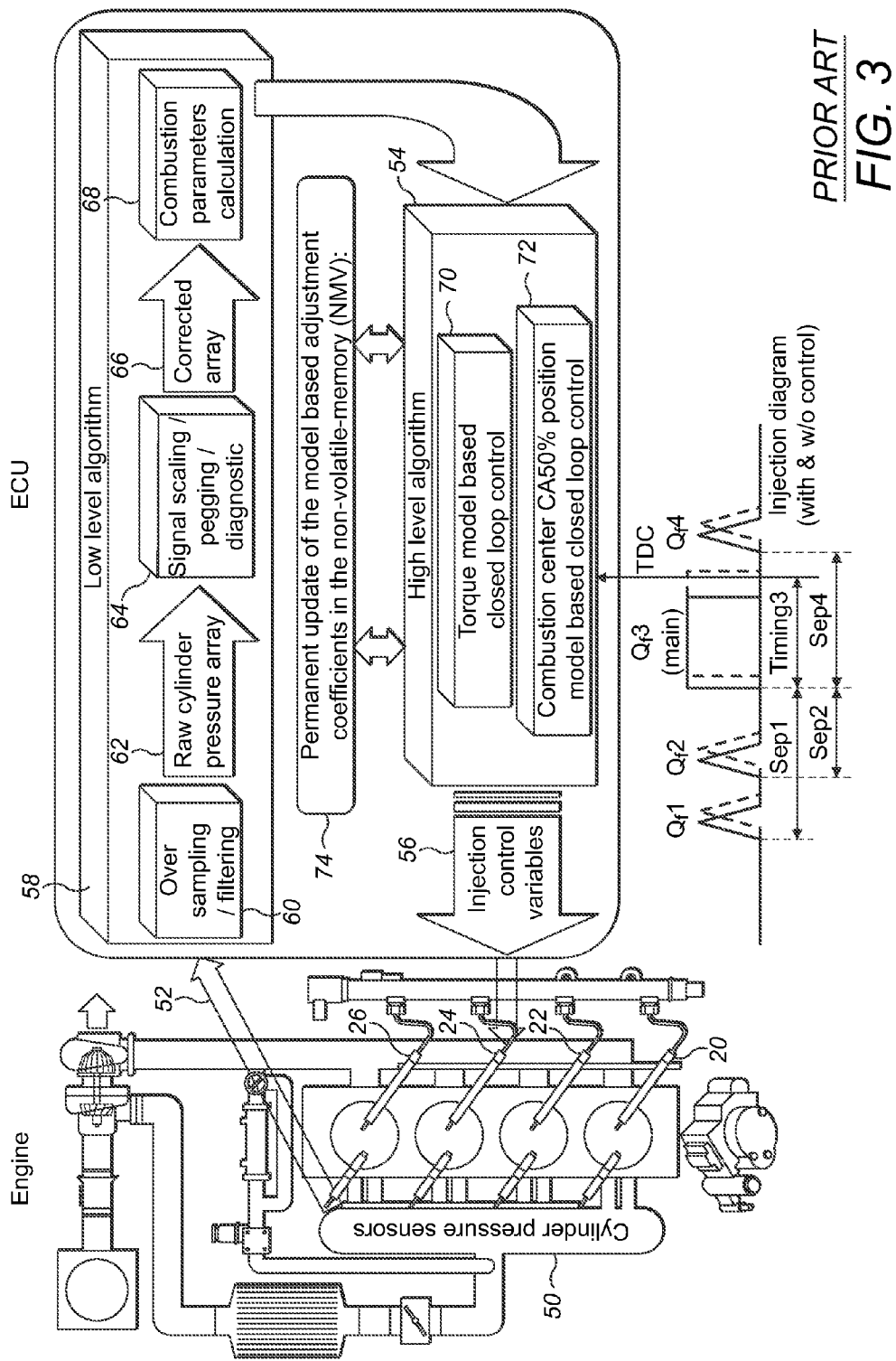
FIG. 3 shows an engine control system incorporating in-cylinder pressure sensors.

FIG. 3 shows a representation of an engine system 10 according to EP Application: 08168714.7 in which in-cylinder pressure measurements from cylinder pressure sensors (indicated generally as feature 50) are fed (arrow 52) into the vehicle's engine control unit 38. The control method in accordance with the control system is generally represented by the "high level" algorithm box 54, the output of which are injection control variables 56 which are sent to the engine's injectors 20, 22, 24, 26.

Prior to the sensor output 52 being used by the high level algorithm 54, a "low level" algorithm 58 cleans up the sensor data and calculates a number of combustion parameters which are then used by the high level algorithm 54.

In order to reduce the calculation load on the ECU and to enable the engine model 54 to calculate injection control variables sufficiently quickly at all engine speeds the in-cylinder pressure measurements may conveniently be oversampled.

Within the low level algorithm 58 therefore the oversampled output of the sensors 50 is filtered by a filtering module 60 to produce a raw cylinder pressure array 62. The raw array 62 may then be passed to a scaling and diagnostic module 64 which performs pressure measurement pegging and other scaling functions in order to output a corrected pressure array 66. It is noted that the applicant's patent application EP1936157 describes a pressure pegging method that may be utilised here.

The corrected pressure array 66 is then sent to a combustion parameters calculation module 68 which calculates a number of combustion parameters as described below which may then be used by the control method of an embodiment of the present invention.

Parameters calculated in the module 68 may comprise: the indicated mean effective pressure (IMEP) in bar (it is noted that the indicated engine torque=IMEP enginexswept volume (a constant)); CA50%, the cumulative heat release rate (HRR); peak pressure and location of peak pressure; the pressure derivative with respect to crank angle, $DP/D\alpha$, for combustion noise calculations (in particular the max $DP/D\alpha$ and location of this maximum may be calculated).

The control method in accordance with control system described therein is, as noted above, generally represented by the "high level" algorithm box 54. The control method provides a mechanism for determining fuel quantities via a torque model 70 and for determining injection timings via a combustion centre position model 72. Both models predict injection parameters with reference to one or more mathematical functions (as described below). In order to maintain the accuracy of the various engine models 70, 72 model coefficients 74 are adjusted with reference to actual measured engine parameters. The adjusted model coefficients are permanently stored within the non-volatile memory of the ECU 38.

The inventors of the present invention have realised that, in systems such as the one described above, the presence of in-cylinder pressure measurements provides a mechanism by which the cam sensor can be removed from the control system and its function replaced by the in-cylinder pressure signals. The present invention may be used with single cylinder measurements to achieve the same or similar performance of a single target cam signal or may be used with multi-cylinder individual measurements to enhance engine cold stars by reducing synchronisation times (With only one sensor, pressure signal acts as a single target cam profile with one compression per engine cycle. With multiple sensors there are as many compressions as sensors per engine cycle. This means that for a 4 cylinders engine with 4 pressure sensors it is equivalent to a 4 targets cam sensor).

Figure 1:
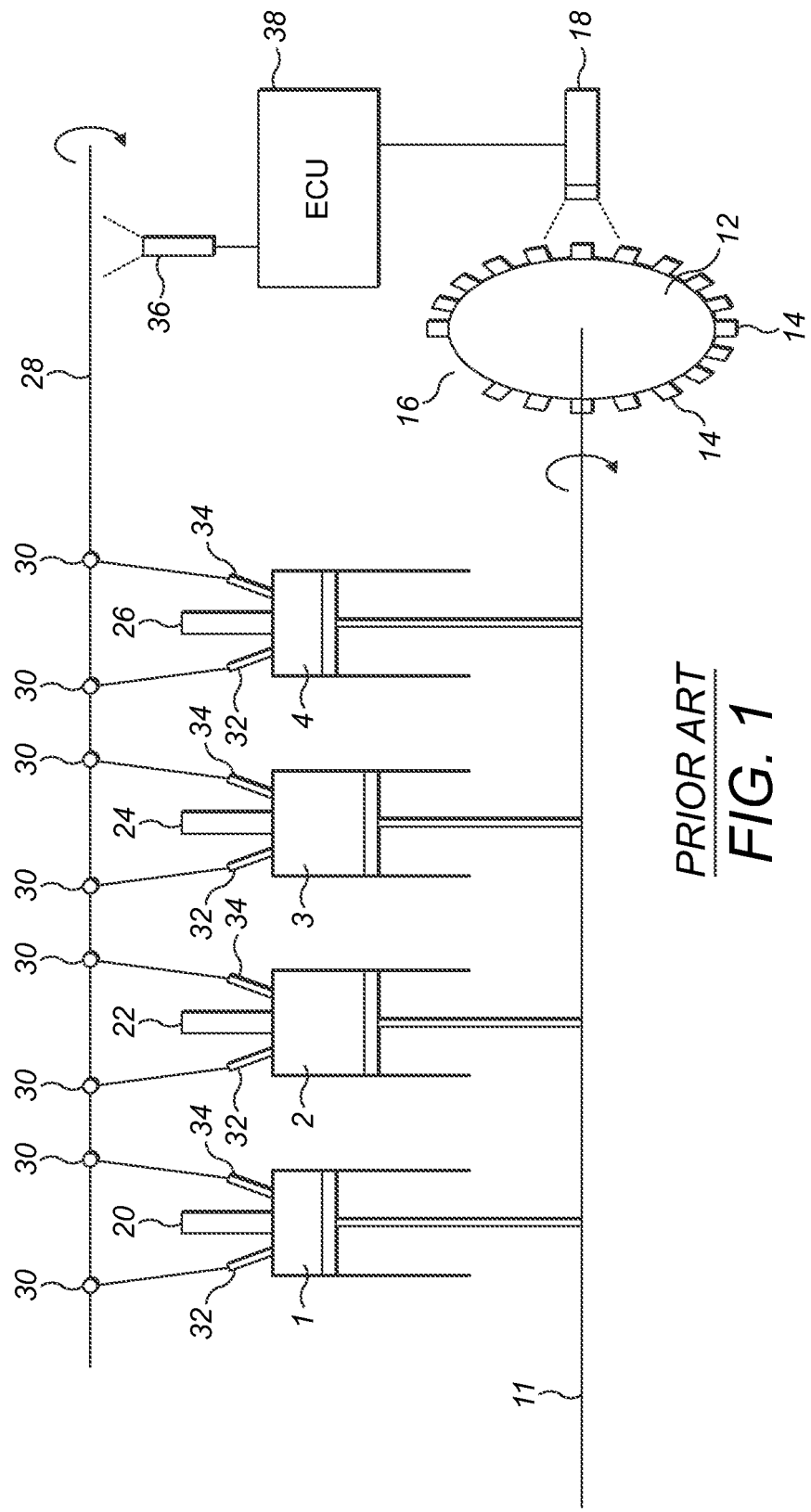
FIG. 1 shows a representation of a typical engine system.
Figure 4:
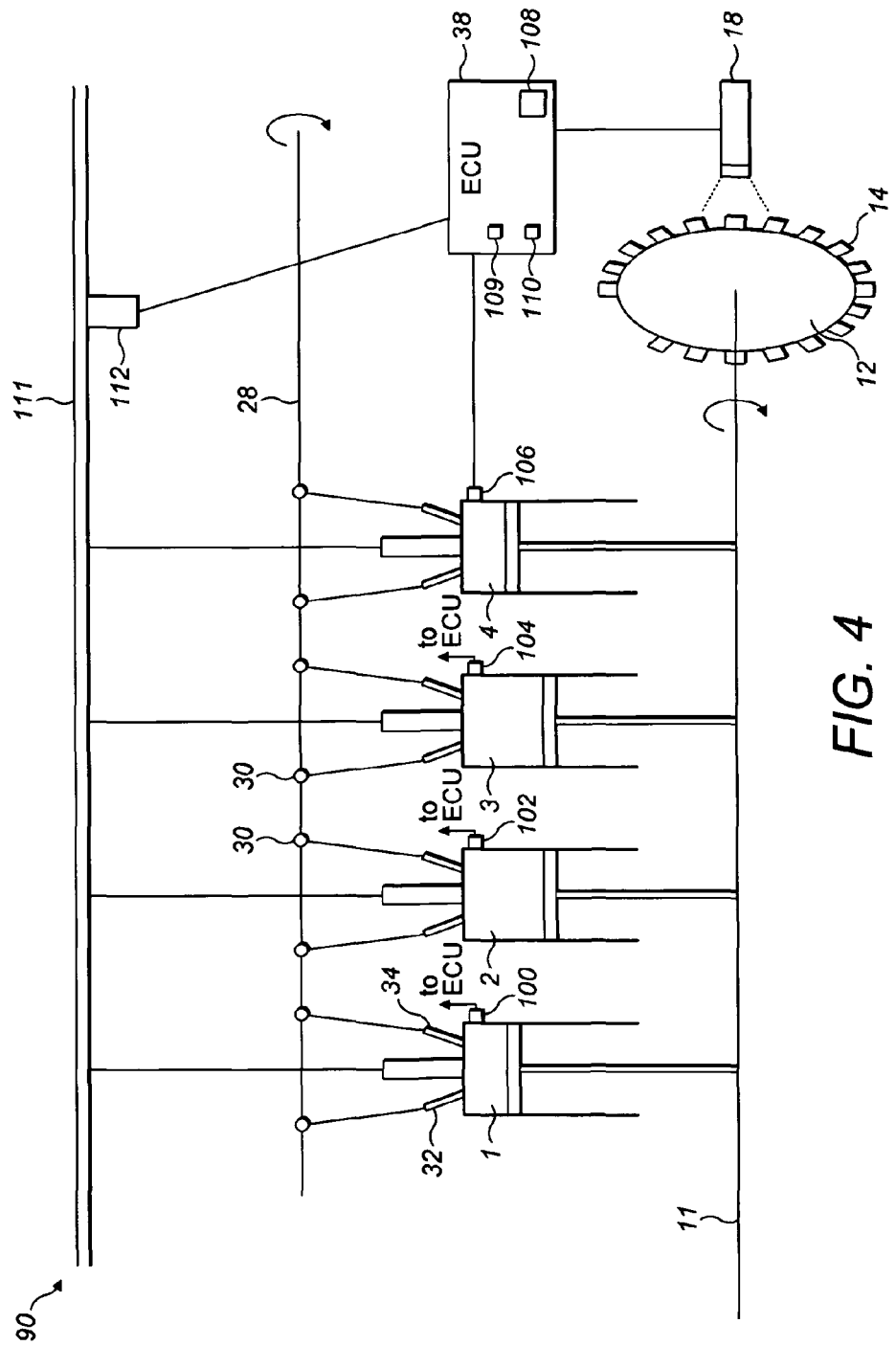
FIG. 4 shows a representation of an engine system according to an embodiment of the present invention.

FIG. 4 shows a representation of an engine system 90 suitable for use with embodiments of the present invention. Like numerals have been used to denote like features with reference to FIG. 1. It can now be seen that there is no cam sensor. Each cylinder now additionally comprises a pressure sensor 100, 102, 104, 106 arranged to return a pressure signal to the ECU 38. The ECU (or a module or microcontroller 108 within the ECU) monitors the received pressure signals from the cylinders (1, 2, 3, 4) and determines whether a given cylinder meets ignition or injection thresholds. FIG. 4 therefore also shows a monitoring module 109 and processor 110 (for clarity the monitoring module and processor 109, 110 are only shown located within the ECU 38. In the event that the present invention is embodied within a module/microcontroller 108 then the monitoring module and processor would also or alternatively be located within the module 108).

Once the ECU or module has determined that a cylinder is ready for injection/ignition then the processor 110 may be arranged to phase the injection/ignition accordingly.

FIG. 4 additionally depicts a common rail 111 and a rail sensor 112. The rail sensor 112 outputs a fuel pressure signal to the ECU 38 for use in determining cylinder readiness for injection or ignition.

Figure 5:
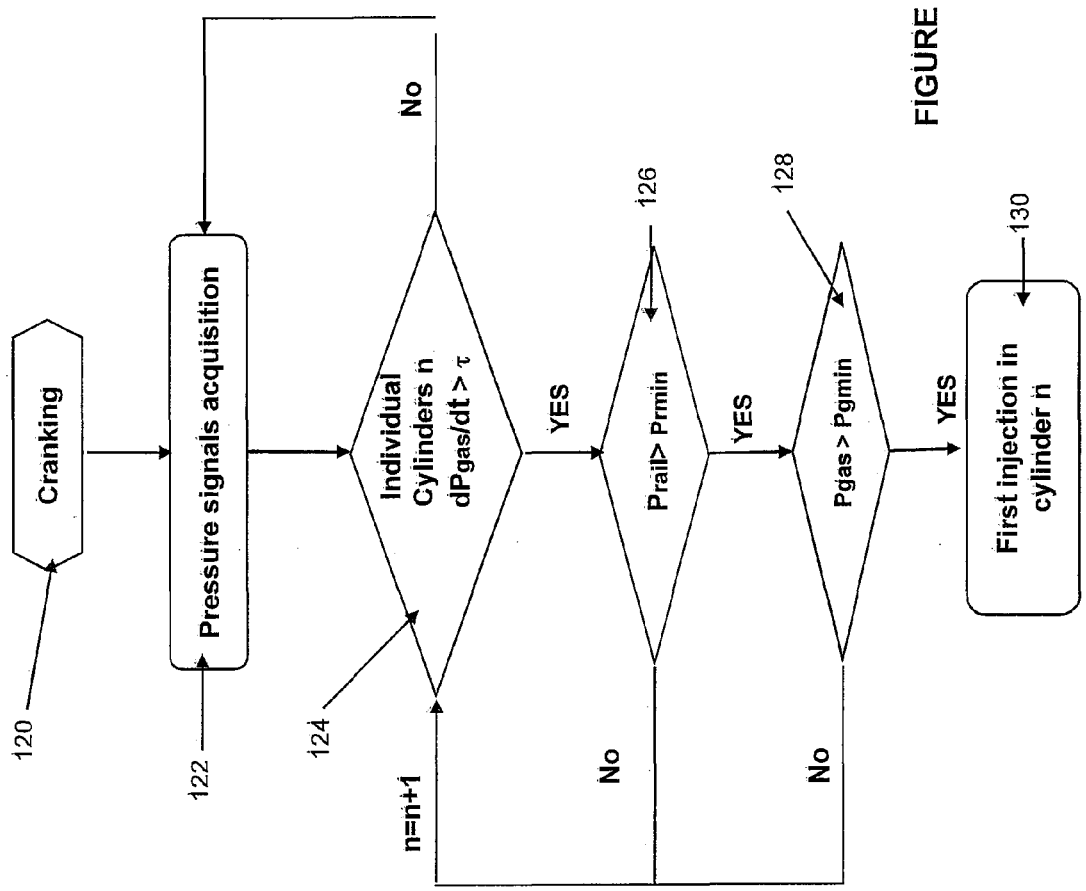
FIG. 5 is a flow chart of a method of determining cylinder readiness in accordance with an embodiment of the present invention.

FIG. 5 is a flow chart representing a method of determining cylinder readiness for injection/ignition in accordance with an embodiment of the present invention.

In Step 120, the engine is cranked (engine start up).

In Step 122, the in-cylinder pressure sensors (100, 102, 104, 106) supply pressure readings to the ECU 38 (or processing module/microcontroller 108) at time t.

In Step 124, a first determining step is performed by the ECU 38 (module/microcontroller 108/processor 110) to determine the phasing of the cylinders (1, 2, 3, 4) within the engine 10. This step is a synchronisation step (a stroke recognition step) and replaces the function provided by the cam sensor (36) signal in prior art systems. In Step 124, the ECU 38 calculates the rate of change of cylinder pressure with respect to time (or crank angle). The present invention uses cylinder pressures to determine engine synchronisation. In the presently described embodiment, during cranking, the pressure signal acquisition is time based (i.e. pressure signals are acquired at time intervals dt). It is noted that dt is chosen to be sufficiently large that incorrect detection due to the effects of noise in the engine system is avoided. In other applications and embodiments it is recognised that it is possible to directly use crank angle ($\ominus$) instead of time (t).

If, for a given cylinder n, $dPgas/dt$ is greater than a threshold value ($\tau$), cylinder n is flagged as ready for ignition/injection. In other words the ECU 38 has determined that cylinder n is in its compression stroke. If the rate of change of pressure with time (or crank angle) exceeds the threshold the ECU moves onto step 126. If the threshold value is not met then the ECU cycles back to the monitoring step 122.

In Step 126, a second determining step is performed on cylinder n to determine if the rail pressure (received from the rail sensor 112) exceeds a minimum pressure value (Prmin) required for engine operation (the step represents a hydraulic check). If the Prmin threshold is not met the ECU 38 returns to Step 124. If the threshold value is exceeded then the ECU moves to a thermodynamic check of cylinder n in Step 128.

In a third determining step (a thermodynamic check) in Step 128, the ECU checks to see if the in-cylinder pressure (Pgas) exceeds a threshold value (Pgmin). If the threshold value is exceeded then the ECU injects into cylinder n (in Step 130). If the threshold value is not met (i.e. if Pgas<Pgmin) then no injection takes place since Pgas is insufficient to burn fuel and the ECU returns to step 124 and waits for the next acquisition of pressure values at time=t+dt.

It is noted that the ECU initially monitors all cylinders in Step 124. The first cylinder for which $dPgas/dt$ exceeds the threshold $\tau$ activates the engine synchronisation process in accordance with embodiments of the present invention. The synchronisation process stays active until the engine state is switched from "cranking" to "running" (when idle speed is reached).

Figure 2:
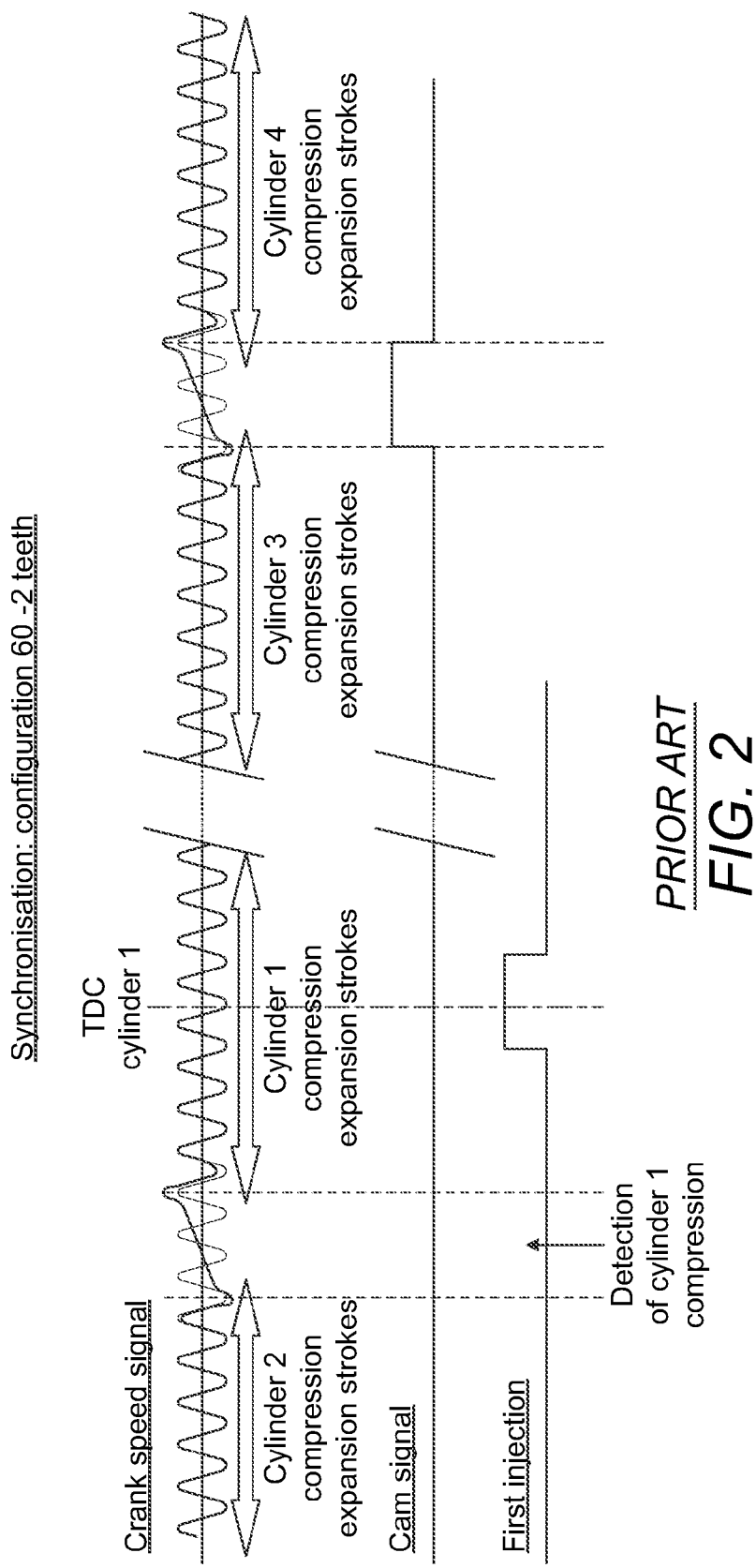
FIG. 2 shows typical signal outputs for a crank speed sensor and a cam sensor.
Figure 6:
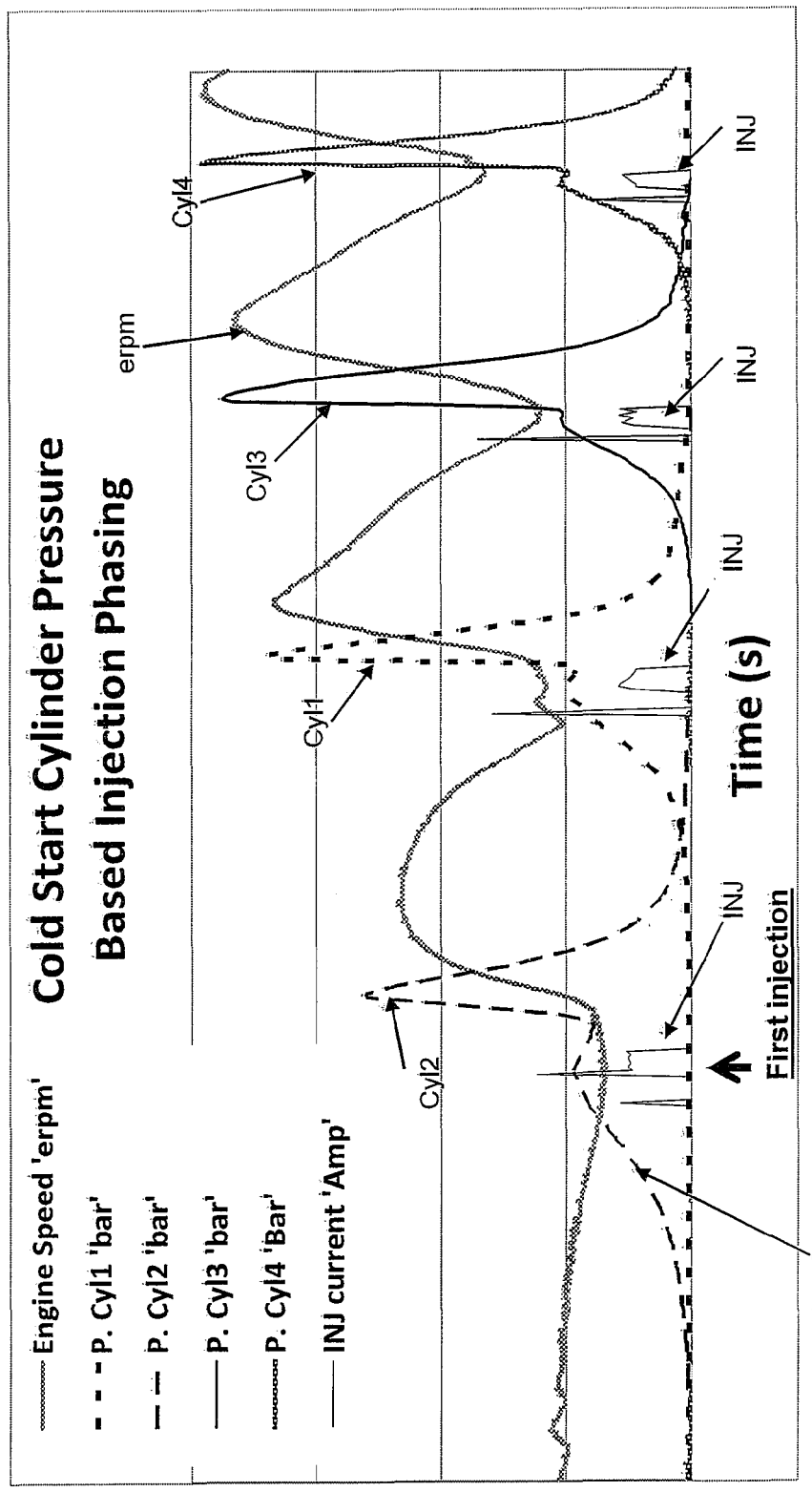
FIG. 6 shows an example of an engine start up in accordance with an embodiment of the present invention.

FIG. 6 shows a trace of in-cylinder gas pressure over time for an engine operating according to the method of the present invention. It can be seen that the start time has been reduced compared to the example of FIG. 2 by ordering the injection in the first cylinder (first TDC is now cylinder 2) when the gas conditions are favourable by virtue of cylinder pressure measurement.

FIG. 6 shows the engine rpm and pressure traces for cylinders 2, 1, 3 and 4. It can be seen that once the compression of cylinder 2 has been detected that injection is scheduled on that cylinder.

It will be understood that the embodiments described above are given by way of example only and are not intended to limit the invention, the scope of which is defined in the appended claims. It will also be understood that the embodiments described may be used individually or in combination.

The invention claimed is:

1. A method of determining whether a cylinder in an engine system comprising a plurality of cylinders is ready for injection/ignition, the method comprising:
monitoring the in-cylinder pressure of each of the plurality of cylinders within the engine system while the engine is cranking;
determining a pressure related parameter for each cylinder within the engine system;
wherein, in the event that the pressure related parameter in a given cylinder exceeds a first threshold prior to any injection/ignition in the given cylinder since the commencement of engine cranking, the method further comprises performing a diagnostic test in order to determine whether the given cylinder is ready for injection/ignition.

2. A method as claimed in claim 1, wherein the pressure related parameter is the rate of change of pressure within the cylinders with respect to time or crank angle.

3. A method as claimed in claim 1, wherein the engine system comprises a common rail for supplying fuel to a plurality of fuel injectors and the diagnostic test comprises monitoring the fuel pressure within the common rail and determining if the rail pressure exceeds a rail threshold value.

4. A method as claimed in claim 1, wherein monitoring in-cylinder pressures comprises receiving a pressure signal from an in-cylinder pressure sensor.

5. A method as claimed in claim 1, wherein the method is performed during engine start up.

6. A method as claimed in claim 1, further comprising outputting a notification signal.

7. A non-transitory computer readable medium comprising a computer program arranged to configure a computer or an electronic control unit to implement the method according to claim 1.

8. A method of determining whether a cylinder in an engine system comprising a plurality of cylinders is ready for injection/ignition, the method comprising:
monitoring the in-cylinder pressure of each of the plurality of cylinders within the engine system;
determining a pressure related parameter for each cylinder within the engine system;
wherein, in the event that the pressure related parameter in a given cylinder exceeds a first threshold, the method further comprises performing a diagnostic test in order to determine whether the given cylinder is ready for injection/ignition;
wherein the pressure related parameter is the rate of change of pressure within the cylinders with respect to time or crank angle;
wherein the engine system comprises a common rail for supplying fuel to a plurality of fuel injectors and the diagnostic test comprises monitoring the fuel pressure within the common rail and determining if the rail pressure exceeds a rail threshold value; and
wherein, in the event that the rail pressure exceeds the rail threshold value, the method further comprises performing a further diagnostic test comprising determining if the pressure within the given cylinder exceeds a second threshold value, the given cylinder being ready for ignition/injection if the pressure within the given cylinder exceeds the second threshold value.

9. A method as claimed in claim 8, wherein, in the event that the pressure in the given cylinder does not exceed the second threshold value, the method further comprises performing a diagnostic test on a next cylinder to exceed the first threshold value.

10. A method of determining whether a cylinder in an engine system comprising a plurality of cylinders is ready for injection/ignition, the method comprising:
monitoring the in-cylinder pressure of each of the plurality of cylinders within the engine system;
determining a pressure related parameter for each cylinder within the engine system;
wherein, in the event that the pressure related parameter in a given cylinder exceeds a first threshold, the method further comprises performing a diagnostic test in order to determine whether the given cylinder is ready for injection/ignition;
wherein the pressure related parameter is the rate of change of pressure within the cylinders with respect to time or crank angle;
wherein the engine system comprises a common rail for supplying fuel to a plurality of fuel injectors and the diagnostic test comprises monitoring the fuel pressure within the common rail and determining if the rail pressure exceeds a rail threshold value; and
wherein, in the event that the rail pressure does not exceed the rail threshold value, the method further comprises performing a diagnostic test on a next cylinder to exceed the first threshold value.

11. A method of determining whether a cylinder in an engine system comprising a plurality of cylinders is ready for injection/ignition, the method comprising:
monitoring the in-cylinder pressure of each of the plurality of cylinders within the engine system;
determining a pressure related parameter for each cylinder within the engine system;
wherein, in the event that the pressure related parameter in a given cylinder exceeds a first threshold, the method further comprises performing a diagnostic test in order to determine whether the given cylinder is ready for injection/ignition;
wherein the diagnostic test comprises determining if the pressure within the given cylinder exceeds a second threshold value, the given cylinder being ready for ignition/injection if the pressure within the given cylinder exceeds the second threshold value.

12. A method as claimed in claim 11, wherein, in the event that the pressure in the given cylinder does not exceed the second threshold value, the method further comprises performing a diagnostic test on a next cylinder to exceed the first threshold value.

13. A control module arranged to determine whether a cylinder in an engine system comprising a plurality of cylinders is ready for injection/ignition, the module comprising:
a monitoring module arranged to monitor the in-cylinder pressure of each of the plurality of cylinders within the engine system while the engine is cranking;

a processor arranged to determine a pressure related parameter for each cylinder within the engine system;

wherein, in the event that the pressure related parameter in a given cylinder exceeds a first threshold prior to any injection/ignition in the given cylinder since the commencement of engine cranking, the module is arranged to perform a diagnostic test in order to determine whether the given cylinder is ready for injection/ignition.

14. A control module as claimed in claim 13, wherein the processor is further arranged to phase the injection or ignition event in dependence on whether the cylinder is ready for injection/ignition.

15. An engine control unit comprising a control module arranged to determine whether a cylinder in an engine system comprising a plurality of cylinders is ready for injection/ignition, the module comprising:

a monitoring module arranged to monitor the in-cylinder pressure of each of the plurality of cylinders within the engine system while the engine is cranking;

a processor arranged to determine a pressure related parameter for each cylinder within the engine system;

wherein, in the event that the pressure related parameter in a given cylinder exceeds a first threshold prior to any injection/ignition in the given cylinder since the commencement of engine cranking, the module is arranged to perform a diagnostic test in order to determine whether the given cylinder is ready for injection/ignition.

16. An engine control unit as claimed in claim 15, wherein the processor of the control module is further arranged to phase the injection or ignition event in dependence on whether the cylinder is ready for injection/ignition.

17. A method of phasing an injection or ignition event in an engine system comprising:

determining whether a cylinder in an engine system comprising a plurality of cylinders is ready for injection/ignition by a method comprising:

monitoring the in-cylinder pressure of each of the plurality of cylinders within the engine system while the engine is cranking;

determining a pressure related parameter for each cylinder within the engine system;

wherein, in the event that the pressure related parameter in a given cylinder exceeds a first threshold prior to any injection/ignition in the given cylinder since the commencement of engine cranking, the method further comprises performing a diagnostic test in order to determine whether the given cylinder is ready for injection/ignition; and phasing the injection or ignition event in dependence on whether the cylinder is ready for injection/ignition.

18. A non-transitory computer readable medium comprising a computer program arranged to configure a computer or an electronic control unit to implement the method according to claim 17.

19. A method of determining whether a cylinder in an engine system comprising a plurality of cylinders is ready for injection/ignition, the method comprising:

monitoring the in-cylinder pressure of each of the plurality of cylinders within the engine system;

determining a pressure related parameter for each cylinder within the engine system;

wherein, in the event that the pressure related parameter in a given cylinder exceeds a first threshold, the method further comprises performing a diagnostic test in order to determine whether the given cylinder is ready for injection/ignition wherein the pressure related parameter is the rate of change of pressure within the cylinders with respect to time or crank angle; and wherein the diagnostic test comprises determining if the pressure within the given cylinder exceeds a second threshold value, the given cylinder being ready for ignition/injection if the pressure within the given cylinder exceeds the second threshold value.

* * * * *